H. W. MacLACHLAN.
SEPARABLE TELESCOPE OR OPERA GLASS.
APPLICATION FILED DEC. 21, 1918.
1,299,750.
Patented Apr. 8, 1919.
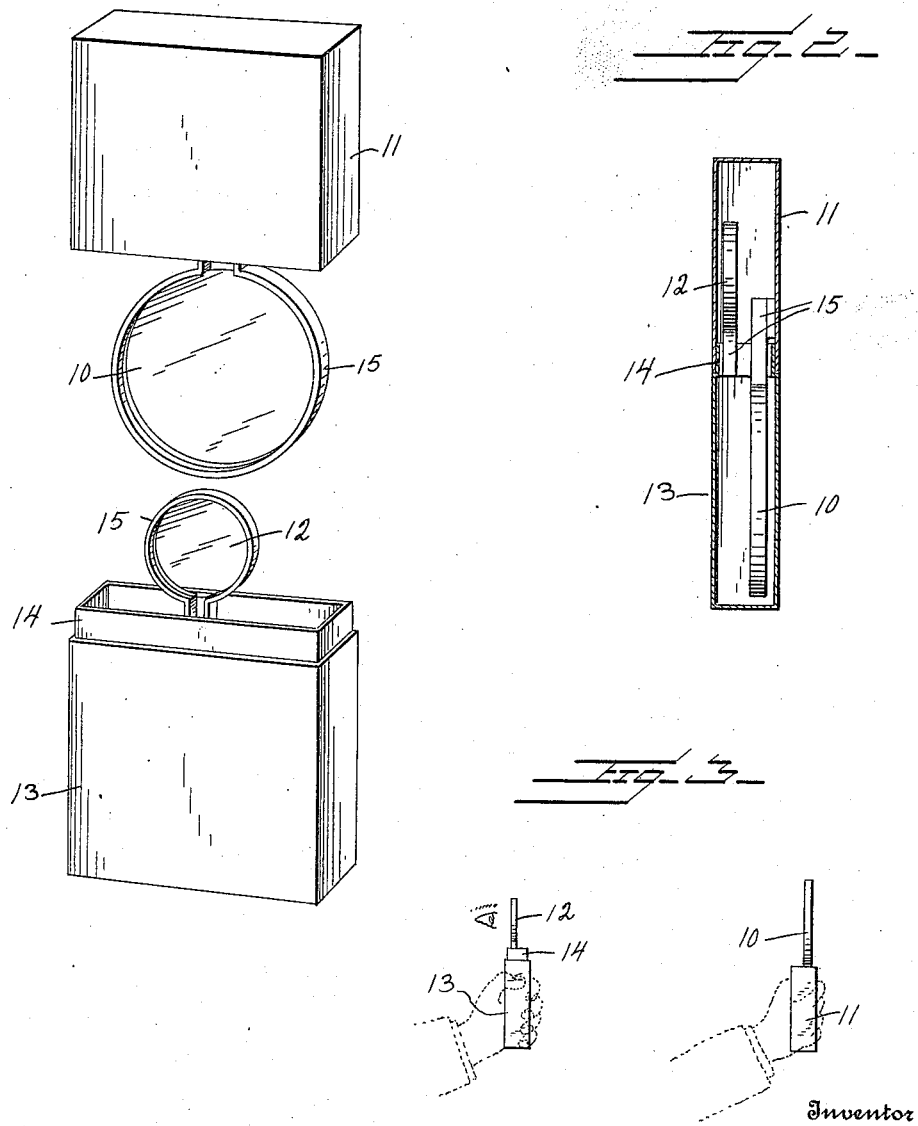
Inventor
H. W. MacLachlan
By Watson E. Coleman
Attorney

UNITED STATES PATENT OFFICE.

HUGH W. MacLACHLAN, OF PETALUMA, CALIFORNIA.

SEPARABLE TELESCOPE OR OPERA-GLASS.

1,299,750.

Specification of Letters Patent.   Patented Apr. 8, 1919.

Application filed December 21, 1918. Serial No. 267,820.

*To all whom it may concern:*

Be it known that I, HUGH W. MACLACHLAN, a citizen of the United States, residing at Petaluma, in the county of Sonoma and State of California, have invented certain new and useful Improvements in Separable Telescopes or Opera-Glasses, of which the following is a specification, reference being had to the accompanying drawings.

This invention relates to opera glasses, telescopes or like optical instruments, and particularly to glasses of that character wherein the lenses of the instrument are entirely separate from each other but are adapted to be placed in coactive relation when the device is used.

The general object of the invention is to provide an article of this character, particularly designed for a pocket telescope or opera glass wherein the lenses are mounted upon two sections so arranged as to receive each the lens of the other section, these sections when disposed together forming a casing wherein the lenses are entirely housed.

A further object is to provide a device of this character so constructed that the lens on one section will fit into the receiving pocket of the other section and the lenses will be prevented from damage by coming in contact with each other or with anything which would tend to scratch them or otherwise mar them.

Other objects will appear in the course of the following description.

My invention is illustrated in the accompanying drawings, wherein:—

Figure 1 is a perspective view of my device with the two sections separated.

Fig. 2 is a vertical sectional view of the device with the sections engaged with each other to close the lenses; and Fig. 3 is a diagrammatic view showing the sections in operative position and in end elevation.

Referring to these figures, it will be seen that the lens 10 is carried by the upper section 11 of a box, this lens 10 being disposed in alinement with the inside face of one side wall of this box or casing section. The lens 12 is mounted upon the other section 13 of the box or casing. This lower section 13 is slightly longer than the section 11 and has a reduced portion 14 which is adapted to be inserted within the open end of the section 11 to thereby form a casing which is entirely closed.

Preferably the casing sections 11 and 13 will be formed of aluminum or other metal but might be formed obviously of pasteboard, celluloid, fiber or any other similar substance. The interior of the sections 11 and 13 may be lined with suitable soft material, if desired. The lower section 13 is larger than the upper section for the reason that this lower section is to contain the plus lens 10 and support the minus lens 12. The minus lens 12 is, of course, considerably smaller in diameter than the lens 10 and, as a consequence, the lower section 13 must be of such length that when the sections 11 and 13 are disposed as in Fig. 3 upon a table or other support, the minus lens 12 will have its axis in exact alinement with the plus lens 10.

In the use of this device the sections 11 and 13 may be used as handles for supporting the lenses or as bases resting upon a table or other flat support. In use the smaller or minus lens is disposed in front of the eye and the section 11 is disposed in front of the first named lens at a distance depending upon the focal length of the lenses and then the sections are moved relatively to each other until the objects seen in the field come in focus.

In practice the case with its sections engaged with each other will be approximately 3½" long by 2" wide and ½" deep and can be readily carried in the pocket. In this device the lenses will be immediately supported by rims 15 which may be made of metal, celluloid, fiber or other material attached in any suitable manner to the proper section of the container and I do not wish to limit myself to any particular manner of supporting the lens upon the container or the particular details of the container itself. The device, it will be obvious, consists of a casing formed in two sections to which the lenses are attached, which sections when placed together entirely hold the lenses, place them in spaced relation to each other and prevent the lenses from being damaged and also act as holders or supports for the lenses.

I claim:—

1. An instrument of the character described including a casing formed in two coacting sections, adapted to be closed upon each other to form a complete casing, and coacting lenses one carried upon and projecting from each section, the lens on each section being housed in the other section of the casing when the sections are closed.

2. An instrument of the character described comprising two coacting hollow sections, one adapted to be inserted within the other, the two sections then forming a complete closed casing, coactive lenses carried by the sections, the lens on one section being adapted to be inserted in and housed by the other section when the sections are placed together, the lens on one section being disposed in parallel spaced relation to the lens on the other section when the two sections are engaged with each other.

3. An instrument of the character described comprising two rectangular casing sections adapted to be engaged with each other, one casing section being less in height than the other casing section, a relatively large lens carried by the smaller casing section and projecting therefrom, and a relatively smaller lens carried by the larger casing section and projecting from the open end thereof, said lenses when the casing sections are engaged with each other projecting into the opposite section and being housed within said sections.

In testimony whereof I hereunto affix my signature in the presence of two witnesses.

HUGH W. MacLACHLAN.

Witnesses:
C. W. BATCHELOR,
I. BATCHELDER.

Copies of this patent may be obtained for five cents each, by addressing the "Commissioner of Patents, Washington, D. C."